(12) United States Patent
Malik et al.

(10) Patent No.: US 10,970,803 B2
(45) Date of Patent: *Apr. 6, 2021

(54) FINGERPRINTING OF DATA

(71) Applicants: SONY CORPORATION, Tokyo (JP); SONY PICTURES ENTERTAINMENT INC., Culver City, CA (US)

(72) Inventors: Sumit Malik, Karnataka (IN); Raja Sahi, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,329

(22) Filed: Mar. 5, 2018

(65) Prior Publication Data

US 2018/0197266 A1    Jul. 12, 2018

Related U.S. Application Data

(60) Continuation of application No. 15/163,585, filed on May 24, 2016, now Pat. No. 9,911,171, which is a
(Continued)

(51) Int. Cl.
*G06T 1/00* (2006.01)
*G06F 21/10* (2013.01)
*G11B 20/00* (2006.01)

(52) U.S. Cl.
CPC ............ *G06T 1/0021* (2013.01); *G06F 21/10* (2013.01); *G11B 20/00086* (2013.01);
(Continued)

(58) Field of Classification Search
CPC .............................. G06T 1/0021; G06F 21/10
See application file for complete search history.

(56) References Cited

U.S. PATENT DOCUMENTS

| | | |
|---|---|---|
| 5,027,401 A | 6/1991 | Soltesz |
| 6,185,316 B1 | 2/2001 | Buffam |

(Continued)

FOREIGN PATENT DOCUMENTS

| | | |
|---|---|---|
| CN | 1346473 A | 4/2002 |
| CN | 1361882 A | 7/2002 |

(Continued)

OTHER PUBLICATIONS

Communication dated Jan. 24, 2011 from European Patent Application No. 04749621.1.

(Continued)

*Primary Examiner* — Ruiping Li
(74) *Attorney, Agent, or Firm* — Procopio, Cory, Hargreaves & Savitch LLP

(57) ABSTRACT

Fingerprinting, including: receiving a plurality of master datasets, each master dataset divided into a plurality of input segments, wherein at least one master dataset of said plurality of master datasets is uniquely marked; selecting a corresponding input segment from one of said plurality of master datasets; storing a segment identifier indicating from which master dataset said selected corresponding input segment was selected; and sending said selected corresponding input segment to a client computer system over a computer network.

6 Claims, 9 Drawing Sheets

Related U.S. Application Data continuation of application No. 13/929,552, filed on Jun. 27, 2013, now Pat. No. 9,349,151, which is a continuation of application No. 11/379,549, filed on Apr. 20, 2006, now Pat. No. 8,483,423, which is a division of application No. 10/815,435, filed on Mar. 31, 2004, now Pat. No. 7,068,823.

(60) Provisional application No. 60/480,687, filed on Jun. 23, 2003, provisional application No. 60/491,763, filed on Jul. 31, 2003.

(52) U.S. Cl.
CPC ............... *G11B 20/00884* (2013.01); *G06F 2221/0733* (2013.01); *G06F 2221/0737* (2013.01); *G06T 2201/0064* (2013.01)

(56) References Cited

U.S. PATENT DOCUMENTS

| | | |
|---|---|---|
| 6,185,318 B1 | 2/2001 | Jain et al. |
| 2002/0012445 A1 | 1/2002 | Perry |
| 2002/0099947 A1 | 7/2002 | Evans |
| 2002/0150239 A1 | 10/2002 | Carny et al. |
| 2003/0009671 A1 | 1/2003 | Yacobi et al. |
| 2003/0028796 A1 | 2/2003 | Roberts et al. |
| 2003/0039380 A1 | 2/2003 | Sukegawa et al. |

FOREIGN PATENT DOCUMENTS

| | | |
|---|---|---|
| WO | 99/62022 A1 | 12/1999 |
| WO | WO 9962022 A1 * | 12/1999 |

OTHER PUBLICATIONS

Trappe, Wade, et al. "Anti-Collusion Fingerprinting of Mulitmedia", I.E.E.E., Transactions on Signal Processing, vol. 51, No. 4, Apr. 2003.

Sunsel, Bilge, et al. "Robest Watermaking of Fingerprint Images," I.E.E.E, Pattern Recognition, vol. 35, pp. 2739-2747, Oct. 2001.

Communication pursuant to Artivle 94(3) EPC for EP application No. 04749621.1 dated Jun. 19, 2015 in 7 pages.

* cited by examiner

FINGERPRINTING OF DATA

CROSS-REFERENCE TO RELATED APPLICATIONS

This application is a continuation application of co-pending U.S. patent application Ser. No. 15/163,585, entitled "Fingerprinting of Data", filed May 24, 2016 (which will issue as U.S. Pat. No. 9,911,171), which is a continuation application of U.S. patent application Ser. No. 13/929,552, entitled "Fingerprinting of Data", filed Jun. 27, 2013 (now U.S. Pat. No. 9,349,151), which is a continuation application of U.S. patent application Ser. No. 11/379,549, entitled "Fingerprinting of Data", filed Apr. 20, 2006 (now U.S. Pat. No. 8,483,423), which is a divisional application of co-pending U.S. patent application Ser. No. 10/815,435, entitled, "Fingerprinting of Data", filed Mar. 31, 2004 (now U.S. Pat. No. 7,068,823), which claimed benefits of priority of U.S. Provisional Patent Application Ser. No. 60/480,687, entitled "Fingerprinting of Data using Pseudo-random Combinations of Marked and Unmarked Content", filed Jun. 23, 2003 and U.S. Provisional Patent Application Ser. No. 60/491,763, entitled "Fingerprinting of Data", filed Jul. 31, 2003. The disclosures of the above-referenced patent applications are hereby incorporated by reference.

BACKGROUND

The rapid growth of the Internet and the resulting possibility of copying and dissemination of digital data have led to growing demand for ways to prevent these illegal activities and to protect copyright holders against the problems associated with pirated copies. For example, unauthorized copies may be made of an authorized distribution copy (e.g., a commercial copy) of digital data. Watermarks can provide the copyright holder with evidence that a given document of the digital data is the copyright holder's own intellectual property by comparing the document with an unauthorized or illegally disseminated copy. To discourage, prevent, or inhibit the proliferation of unauthorized copies, it is often useful to know the source of an unauthorized copy by determining the particular distribution copy that was used to make the unauthorized copy. However, it can be difficult to use watermarking to identify the distribution copy that was used to generate the unauthorized copy.

Digital watermarking can be used to determine the source of an unauthorized or illegally disseminated copy. For example, when a document is to be secured using digital watermarking, an identifier that identifies the customer who is to receive the electronic distribution copy of the document can be imperceptibly embedded in the document, along with the copyright holder's watermark. If the customer disseminates copies of the distribution copy contrary to the interests of the copyright holder, the customer can be identified based on the digital watermark, which will be contained in all of the unauthorized or illegally disseminated copies. However, when many distribution copies are to be legally disseminated to many different customers, individually digital watermarking each distribution copy has typically proven to be inconvenient and time consuming.

SUMMARY

The present invention provides methods and apparatus for implementing fingerprinting data. In one implementation, a method of fingerprinting includes: receiving a plurality of master datasets, each master dataset divided into a plurality of input segments, wherein at least one master dataset of said plurality of master datasets is uniquely marked; selecting a corresponding input segment from one of said plurality of master datasets; storing a segment identifier indicating from which master dataset said selected corresponding input segment was selected; and sending said selected corresponding input segment to a client computer system over a computer network.

DETAILED DESCRIPTION

This disclosure describes systems and methods that provide greater efficiency in fingerprinted media production and system robustness.

In one implementation, a fingerprinting system provides fingerprinting of data using pseudo-random combinations of marked and unmarked contents. The fingerprinted data can then be used to uniquely identify the content using forensics. The system is applicable to various types of data, such as video and audio elementary data or multiplexed streams. The system can also be applied to packaged media, such as DVDs and video tapes, content downloaded from the Internet, and/or any other medium.

Figure 1:
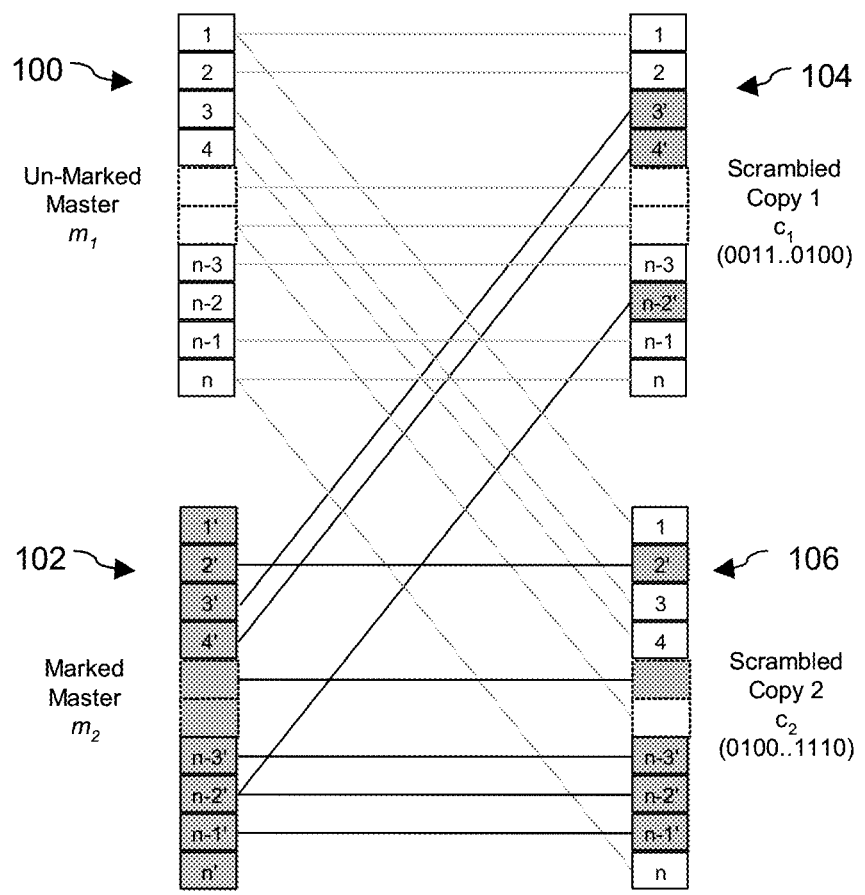
FIG. 1 illustrates an implementation of a process for producing fingerprinted content using two masters.

FIG. 1 illustrates an implementation of a process for producing fingerprinted content using a first master 100 and a second master 102. In other implementations, different numbers of masters can be used, such as three or more. The process involves generating a plurality of masters ($m_i$), where index i indicates the i-th master. The first master 100 is unmarked. The second master 102 is uniquely marked, such as by using a digital watermarking technique. In another implementation with three or more masters, one master is unmarked and each of the other masters is uniquely marked (e.g., the second master is marked differently from the third master). In another implementation, each master is uniquely marked.

The masters 100, 102 are then divided into n parts or segments. Each segment in the unmarked master 100 is the same size and has the same content as the corresponding segment of the marked master 102 (e.g., segment 1 of master 100 is the same size as and includes the same content as segment 1 of master 102). In this way, copies 104, 106 can be generated by pseudo-randomly combining segments from different masters 100, 102, as described below. Although the content of the unmarked master 100 is identical to the content of the marked master 102, each master will have different marking. For example, the first segment of the unmarked master 100 has the same content as the first segment of the marked master 102, but the first segment of the unmarked master 100 is not marked and the first segment of the marked master 102 is marked. As a result, the underlying information in corresponding segments is the same, though the data may be different in ways that do not affect the content but allow the segments to be distinguished (as is typical when comparing unmarked and watermarked data).

Based on a pseudo-random generation of a combination of n respective segments from m masters, a copy of the masters is generated that includes the same n respective segments as the masters but each segment is taken from a pseudo-randomly selected master. The segments are selected and combined (concatenated) in a pseudo-random manner so that those n segments produce a copy with a pseudo-randomly generated sequence of segments as a fingerprint. The fingerprint for a copy identifies the source master for each segment in the copy. Thus, the pseudo-random generation is configured so that a sufficiently distinct fingerprint can be generated for each copy. A plurality of pseudo-random numbers is generated that pseudo-randomly assigns the segments from the masters so that sufficiently distinct fingerprints can be assigned to all copies without repeating the pattern of segment combinations. Therefore, the number of generated pseudo-random numbers must equal or exceed the number of desired copies.

Figure 2:
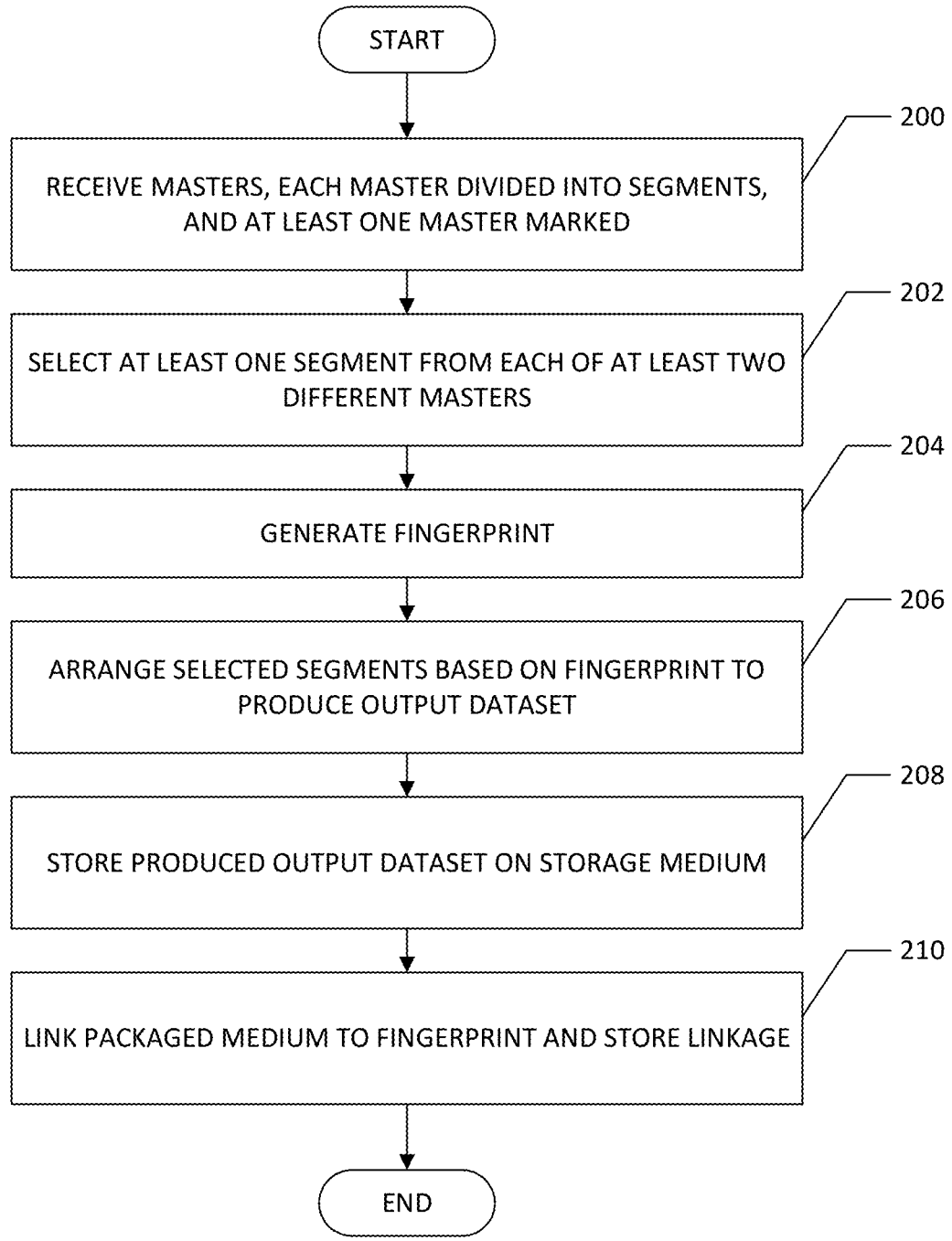
FIG. 2 illustrates a method for implementing fingerprinting of data.

A method for implementing an above-described fingerprinting of data is illustrated in a flowchart shown in FIG. 2. A plurality of masters is received, at 200, where each master is divided into a plurality of segments, and each master is uniquely marked (e.g., digital watermarking). In one implementation, one master is left unmarked. The first segment in a master corresponds to the first segment of each of the other masters. In one implementation, each segment is distinguishable (the master to which that segment belongs can be determined) from the corresponding segments of other masters because of the respective marking (or lack of marking) in the segments. In another implementation, less than all of the segments are distinguishable from corresponding segments.

At least one segment from one of at least two different masters is selected, at 202. At 204, a fingerprint is then generated. In one implementation, the fingerprint is a pseudo-random number sequence. At 206, the selected segment(s) is arranged, based on the fingerprint, to produce an output dataset, such that the number of segments in the output dataset is equal to the number of segments in each master. An example of selecting and arranging the segments is described below referring to FIG. 3. The produced output dataset is stored on an article of media, such as a packaged medium (e.g., burned onto a CD or DVD, copied onto a VHS tape), at 208, to produce a distribution copy. The fingerprint is linked to the packaged medium, at 210, and the linkage is stored (e.g., the fingerprint, an ID code identifying the specific media item, and an ID code identifying the customer to receive the item are stored in a database table entry).

The pseudo-random number generator determines the pattern in which the segments are to be selected and arranged. Thus, the generator must generate a sufficiently large number of pseudo-random numbers without repetition. In one implementation, the generator generates a number including one digit for each segment and each digit has a range from 1 to the number of masters. Each digit corresponds to a segment in the copy and the value of the digit indicates from which master the segment has been copied. In another implementation, the generator generates a number appropriate for each segment as a digit and collects the digits together into a pattern.

Figure 3:
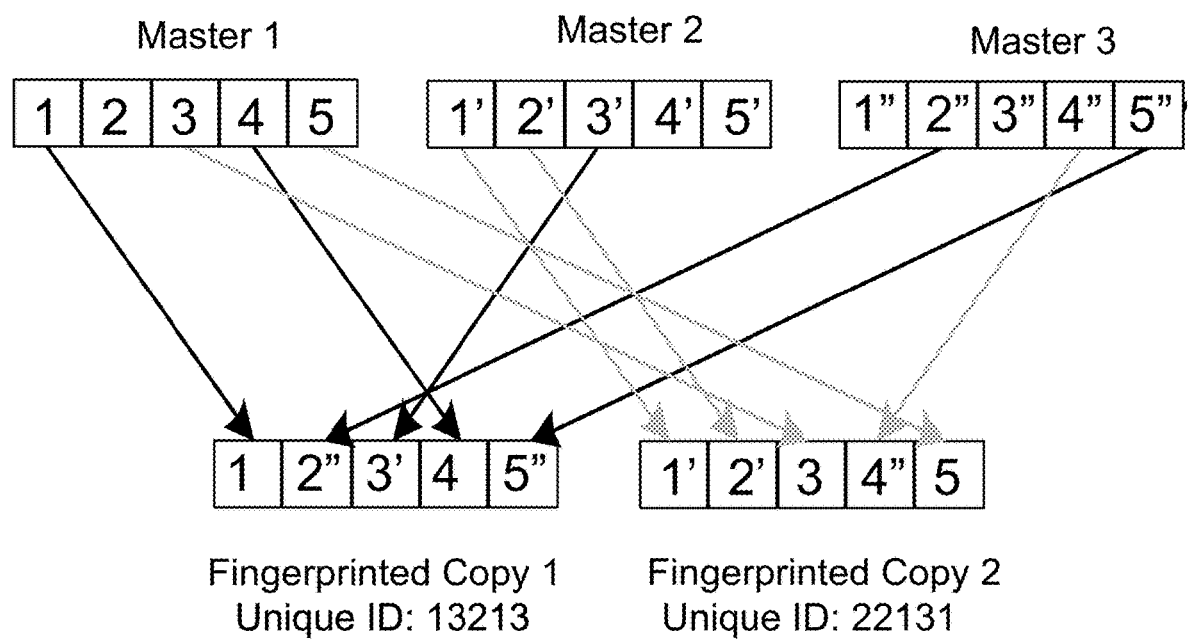
FIG. 3 illustrates a representation of combining three masters with five segments each.

For example, as shown in FIG. 3, if there are three masters 1, 2, and 3, and each master is divided into five segments, then the pseudo-random number generator generates a five-digit number with each digit ranging in value from 1 to 3, generating number patterns like '13213' and '22131'. These pseudo-random number patterns can be used to generate segments of Copy 1 and Copy 2, respectively, with each digit of the number pattern indicating the segment of a source master.

For example, segments of Master 1 are represented by a sequence of numbers ranging from 1 to 5, segments of Master 2 are represented by a sequence of numbers ranging from 1' to 5', and segments of Master 3 are represented by a sequence of numbers ranging from 1" to 5". In the illustrated example of FIG. 3, a pseudo-random number generator has assigned pseudo-random number sequence '13213' to Copy 1 and pseudo-random number sequence '22131' to Copy 2. Thus, sequence '13213' of Copy 1 indicates that segment 1 is to be copied from Master 1, segment 2 is to be copied from Master 3, and so on. Therefore, Copy 1 segments can be generated as 1-2"-3'-4-5". Copy 2 segments can be similarly generated as 1'-2'-3-4"-5. The pseudo-random number sequence for each copy can then be stored in a database and linked to a particular user that requested the data and/or to an article of media storing the data. These database entries can be used for source identification later.

To provide insight into efficiency of fingerprinted media production and system robustness, factors that determine the number of pseudo-random number sequences can be analyzed. For example, the number of possible individual fingerprints is determined by three factors: a number of masters (m), a number of segments in a master (n), and a minimum number of segments that are interchangeable (k). Using these factors, the number of combinations (c) can be determined as follows.

If up to n segments are interchangeable, then the number of combinations is determined as:

$$c = \sum_{n'=1}^{n} m^{n'} = 1. \qquad [1]$$

If up to k segments out of n are interchangeable, then the number of combinations is determined as:

$$c = \sum_{k'=1}^{k} (m-1)^{k'} \cdot {}^{n}C_{k'}, \qquad [2]$$

If exactly k segments out of n are interchangeable, then the number of combinations is determined as:

$$c = (m-1)^{k} \cdot {}^{n}C_{k}, \qquad [3]$$

where ${}^{n}C_{k'}$ represents a combination of n things taken k' at a time, and ${}^{n}C_{k}$ represents a combination of n things taken k at a time.

For example, if there are two masters (m=2) for a 120-minute movie, and each master is divided into 60 segments (n=60) and only 20 segments (k=20) of the 60 segments are interchangeable, then using equation [2], the number of unique combinations is determined to be 4,191,844,505,805,495 (over 4000 trillion). For a simpler setup, assume there are two masters (m=2), each master has 20 segments (n=20), and all 20 segments are interchangeable. Using equation [1], the number of possible combinations is determined to be 1,048,576. Table 1 illustrates how the combinations scale with the number of masters and segments (Values for c have been approximated for the larger numbers).

TABLE 1

| m | n | c |
|---|---|---|
| 2 | 20 | 1,048,576 |
| 3 | 20 | 3,486,784,401 |
| 5 | 20 | 95,367,431,640,625 |
| 10 | 20 | 100,000,000,000,000,000 |
| 2 | 10 | 1,024 |
| 2 | 20 | 1,048,576 |
| 2 | 60 | 1,152,921,504,606,847,000 |
| 2 | 99 | 633,825,300,114,114,700,000,000,000,000 |

The above-described data fingerprinting techniques can be applied to various different media where physical packages are produced for delivery. For example, the fingerprinting of data can be applied to DVD-packaged media ("Academy screeners") delivered to Academy members for reviewing films, to content media downloaded from the Internet, or to cable-delivered Video-on-demand (VOD). Each of these applications is described in detail below. Other applications include home networking, customized on-demand CD/DVD compilations, client-side "burning" on CD/DVD recordable media, and other related media. Further, the fingerprinting techniques are portable to analog chunking using a switcher.

The problem of piracy from Academy screener media (e.g., DVD-packaged media or VHS tape) is understood and acknowledged. One solution that has been proposed is individually marking (e.g., with unique watermarks) every copy sent out such that the movie is marked, encoded, and "burned" onto each DVD individually or recorded to VHS. However, as noted above, individually marking each copy with a different watermark can be very burdensome and time-consuming.

Figure 4:
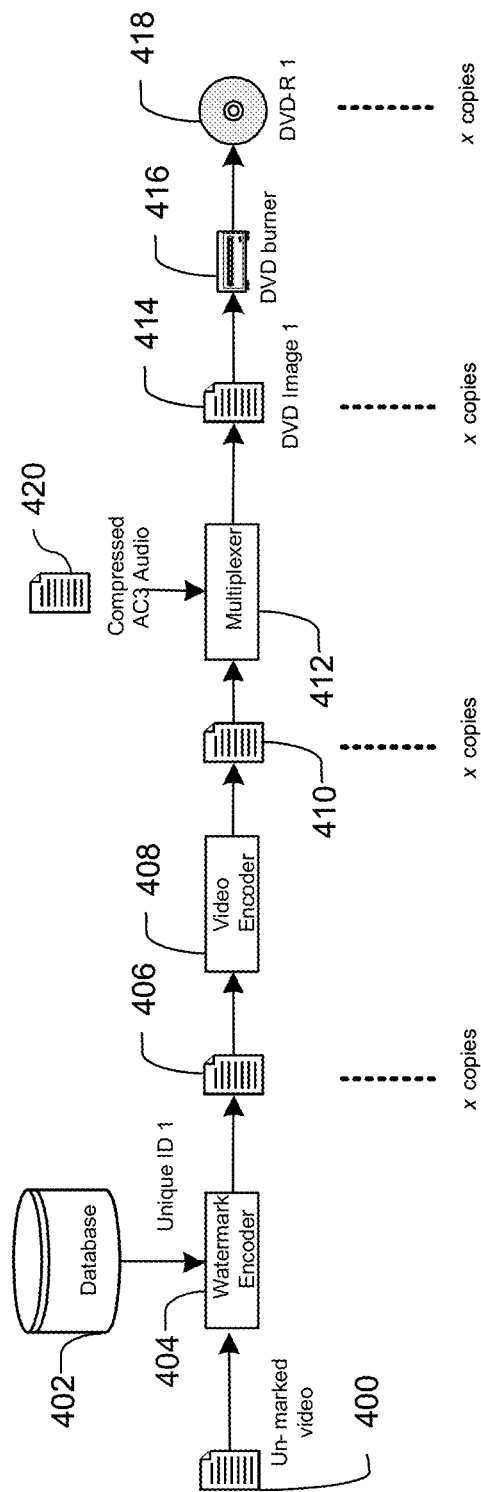
FIG. 4 illustrates one possible implementation of a fingerprinting process for generating DVD-packaged media.

FIG. 4 illustrates one possible implementation of a typical approach to individually marking DVD-packaged media. The process starts with an unmarked video file 400. Identifiers (ID) for all DVD copies to be produced are stored in a database 402.

The video file 400 is watermarked in a watermark encoder 404 with a unique ID to produce a watermarked video file 406. The unique ID is stored in a database entry. The watermarked video file 406 is then encoded with a video encoder 408, which produces a compressed video file 410. In one implementation, the video encoder may be configured as an MPEG-2 encoder.

The compressed video files 410 is combined with a compressed audio file 420 in a multiplexer 412 to produce one or more combined video-audio files and metadata files 414. The one or more combined video-audio files, alongwith the metadata files 414 are burned onto a DVD in a DVD burner 416 to produce a DVD copy 418. An ID identifying the specific DVD is stored in the database entry for the unique ID of the watermark on that DVD.

Although the above process was described in terms of producing an individually marked DVD copy, it should be understood that this process would have to be repeated for the desired number (x) of DVD copies to be made. Therefore, the above-described process is technically possible but practically cumbersome and expensive to achieve. For example, typically, for a 2-hour movie, the watermarking process of the watermark encoder 404 can take up to eight hours. The MPEG-2 encoding process in the video encoder 408 can take up to two hours. The audio-video combining process in the mulitplexer 412 can take up to about 30 minutes, and the DVD burn process can take up to another 30 minutes. Accordingly, it can be seen that production of each DVD copy can take up to about 11 hours. While additional resources can be deployed to create individually marked copies in parallel, for large numbers of copies, parallelism can become expensive.

Figure 5:
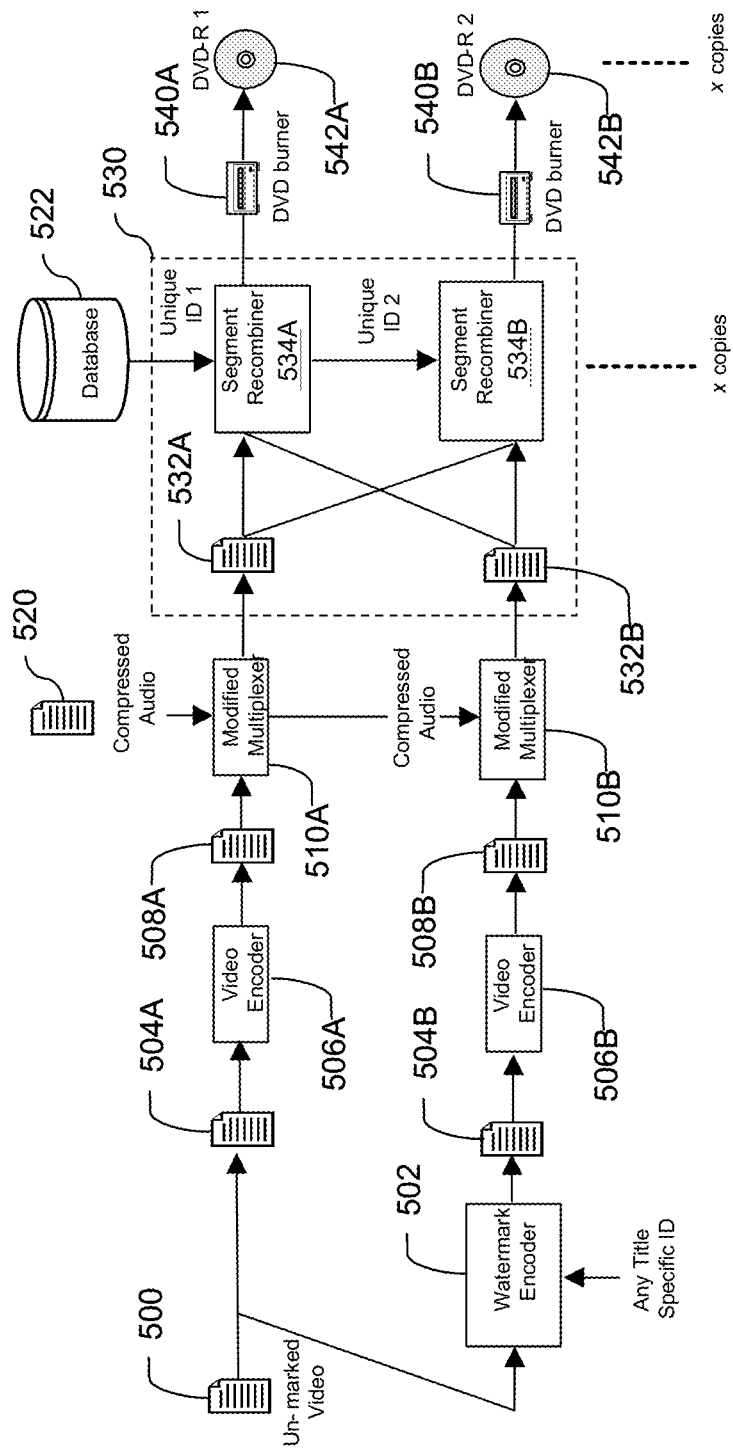
FIG. 5 illustrates another possible implementation of the fingerprinting process for generating DVD-packaged media in accordance with an implementation.

FIG. 5 illustrates an implementation of a fingerprinting process for generating DVD-packaged media. Using the implementation of FIG. 5, the process of generating DVD copies can be significantly expedited.

In the implementation of FIG. 5, the process starts with a video master 500. Two copies 504 of the video master 500 are then produced. The first copy 504A of the video master is unmarked, while the second copy 504B is watermarked by a watermark encoder 502. A specific watermarking identifier (ID) is used to encode the marked copy 504B. In another implementation, a different marking process can be used.

The two copies 504A, 504B of the video master are then encoded with video encoders 506A, 506B, respectively. The video encoders 506A, 506B produce compressed video files 508A, 508B, respectively. The compressed video file 508A is unmarked and the compressed video file 508B is marked. In one implementation, the video encoders are configured as MPEG-2 encoders.

The compressed video files 508A, 508B are combined with a compressed audio file 520 in a pair of multiplexers 510A, 510B, respectively, to produce combined video-audio files 532A, 532B, respectively. The multiplexers 510 are configured to process the compressed files 508 in segments called video objects (VOBs). The combined video-audio file 532A is an unmarked DVD file having a plurality of segments. The combined video-audio file 532B is a marked DVD file having the same number of segments as the unmarked file 532A. Thus, the DVD files 532A, 532B are substantially similar in their relationship as that between the two masters 100, 102 shown in FIG. 1. The VOB segments are described in detail below.

Segment recombiners 534A, 534B use two master DVD files 532A, 532B to generate fingerprinted copies similar to copies 104, 106, shown in FIG. 1. Each segment recombiner 534 uses a unique identifier to recombine (concatenate) different segments of each master 532. As discussed above, each identifier is generated by a pseudo-random number generator, and is stored in a database 522 to identify the recipient of each copy and/or article of media. Thus, FIG. 1 substantially represents the operation of one implementation of block 530.

The fingerprinted copies produced at outputs of the segment recombiners 534A, 534B are then burnt onto DVDs 542A, 542B using DVD burners 540A, 540B, respectively. To make an additional copy, a different combination of segments from the unmarked and marked masters 532A, B is combined in either of the recombiners 534A, B and then burned onto a DVD. The watermarking by the watermark encoder 502, encoding by the encoders 506, and multiplexing and processing by the multiplexers 510 is not repeated for every copy. Accordingly, in the implementation of FIG. 5, in contrast to the implementation of FIG. 4, the recombining of the segments by a recombiner and burning to DVD is repeated to produce the desired number (x) of DVD copies 542 rather than repeating each step in the entire process. Thus, the process illustrated in FIG. 5 should take substantially less time because the watermarking is done once to only one video master. Therefore, the process represented by blocks 530 and 540 should take less than an hour per DVD.

Figure 6:
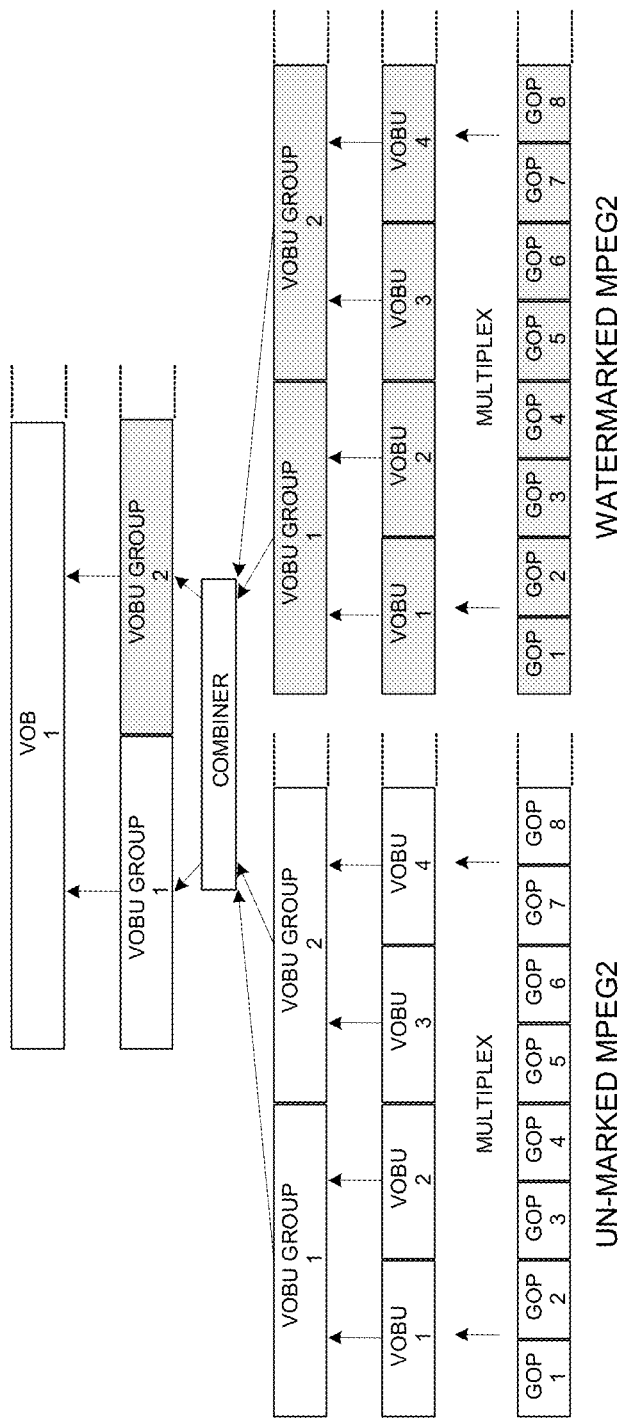
FIG. 6 illustrates a detailed diagram of a segment recombiner configured to process segments of input masters.

FIG. 6 illustrates a detailed diagram of a segment recombiner 534 configured to process segments of input masters in accordance with an implementation specific to DVDs. However, the implementation shown in FIG. 6 can be extended to other packaged media such as video tapes.

The DVD segments are produced at certain predetermined video object unit (VOBU) boundaries and are grouped in 'VOBU Groups'. Each VOBU Group is a standalone, multiplexed unit and does not have dependencies on previous or later units. Furthermore, a VOBU is made up of one or more group of pictures (GOP). A VOBU, as defined in the DVD-VIDEO format, can be 0.4 to 1.2 seconds long. A VOBU Group can have as many VOBUs as necessary.

The VOBU Groups are combined to form a set of VOB files. For each set of VOB files metadata (IFO) files are generated. One of the details that the metadata files provide is offset information for the VOBUs in the VOB file set. To the end user, the playback from this VOB appears just like playback from the VOB on any regular DVD. Internally though the VOB is a combination of VOBU Groups, each VOBU Group being composed of data multiplexed from portions of two distinct video (MPEG-2) encodes. Thus, the VOB follows DVD specification constraints and is substantially compliant. Accordingly, if one of these DVDs is pirated, either by ripping or by re-encoding (e.g., in formats such as $D_iV_x$ or $X_{vid}$), the system can identify the source of the pirate copy by analyzing the video stream and locating the points where the marked video segments exist. The system can compare these locations with the locations stored in the database server that was created when the DVDs were burned. Each DVD has a unique pattern for the marked segments and so each DVD has been effectively "fingerprinted."

An implementation, similar to the implementation shown in FIG. 5, can be used to fingerprint content media downloaded from the Internet. In the illustrated implementation 700 of FIG. 7, two media files, one unmarked 702A and one watermarked 702B, are divided into segments and a combiner 704 combines the segments in unique patterns to produce uniquely fingerprinted versions of the content for each download. Each unique combination is generated using an identifier, which is generated by a pseudo-random number generator, and is stored in a database 706 to identify the fingerprinted copy. The fingerprinted copies are either stored or streamed through the Web server 708 for download to a client PC 712 through the Internet 710. To the client PC 712, the recombined/fingerprinted file 714 appears as one contiguous file. The client has no knowledge of the recombination (i.e., the fingerprinting) that occurred at the Web server 708.

Figure 7:
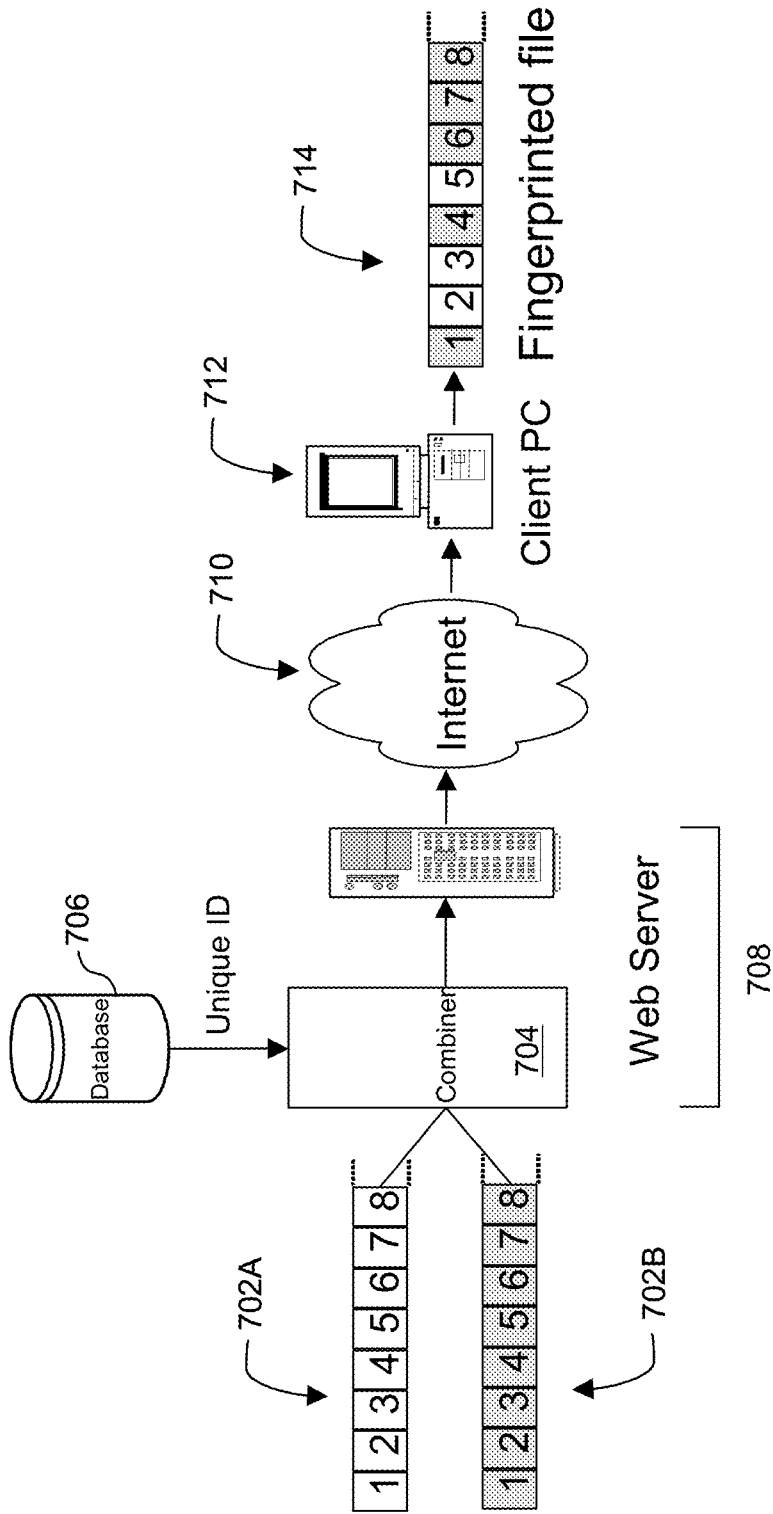
FIG. 7 illustrates one implementation of segment-wise combining two media files to produce uniquely fingerprinted versions of downloaded media.
Figure 8:
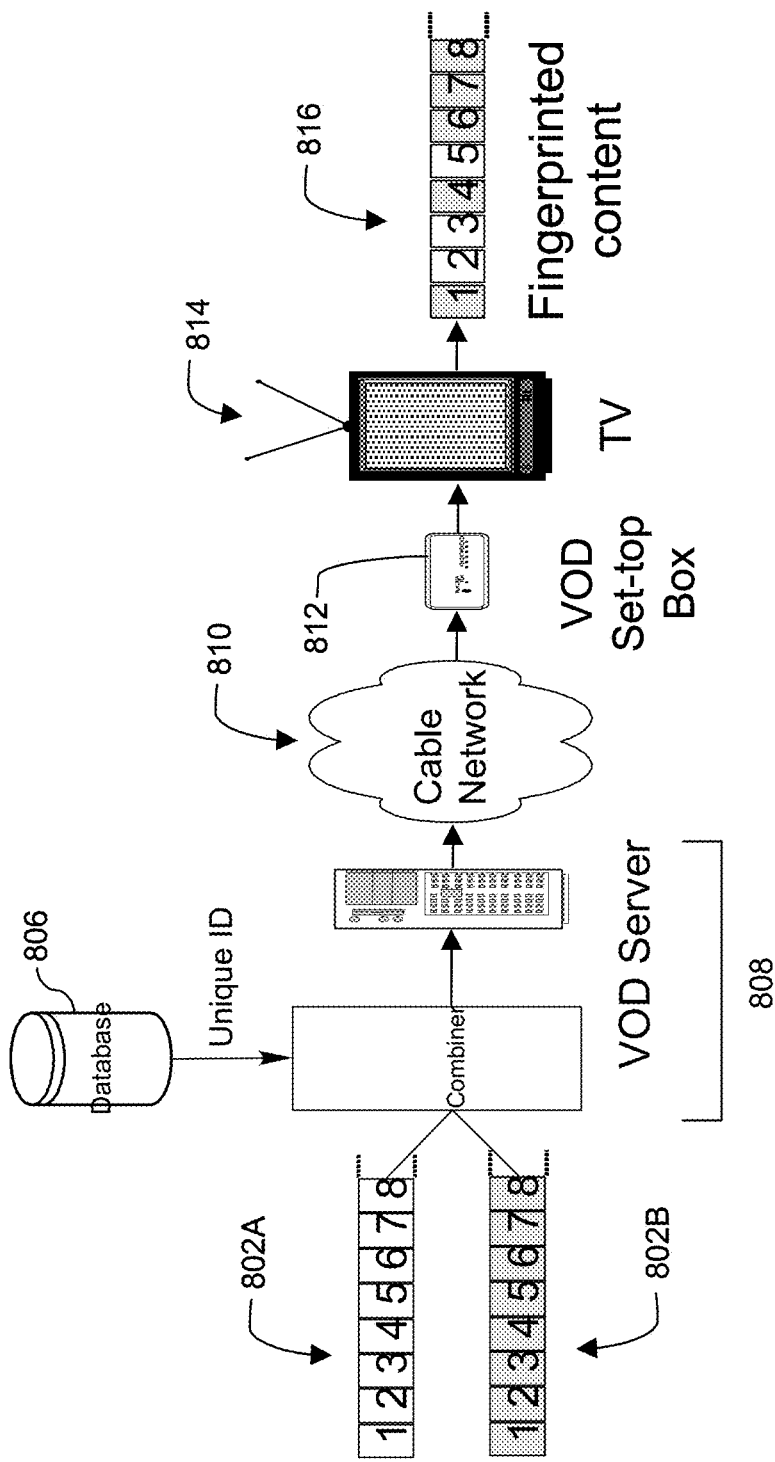
FIG. 8 illustrates one implementation of segment-wise combining two media files to produce uniquely fingerprinted versions of video-on-demand content.

Similar to the implementation of FIG. 7, VOD (video on demand) content can be fingerprinted as shown in FIG. 8. In this implementation, a VOD server creates fingerprinted files from two media files divided into segments, one unmarked 802A and one watermarked 802B. The two media files 802A, 802B are segment-wise combined in a combiner 804 to produce uniquely fingerprinted versions of the content for each delivery. Since VOD media files are usually MPEG-2 transport stream data, which is packetized, these files are good candidates for such fingerprinting.

In the illustrated implementation of FIG. 8, the two media files 802A, 802B are combined in the VOD server 808. Thus, the described scenarios are referred to as unicast scenarios, i.e., the data is combined at the source and then sent to a specific destination, where the destination has no knowledge of the other distribution copies.

In another implementation (not shown), a satellite can broadcast multiple masters to each Satellite Receiver Box (i.e., simulcast of multiple masters to each Box). This implementation is referred to as a multicast scenario. In this implementation, the Satellite Receiver Box receives RMK information from a server and performs the combination before providing the data to the TV. Thus, in this implementation, the combination occurs at the VOD Set-top Box 812.

Each unique combination is generated using an identifier, which is generated by a pseudo-random number generator, and is stored in a database 806 to identify the fingerprinted copy. A fingerprinted copy is delivered to the VOD set-top box 812 through the cable network 810. The fingerprinted copy is processed and delivered to the client TV 814. To the client TV 814, the recombined/fingerprinted file 816 appears as one contiguous file. The client has no knowledge of the recombination (i.e., the fingerprinting) that occurred at the VOD server 808.

The fingerprinting of data can be performed to provide robustness to the system and a method of media source identification. Specifically, the pseudo-random generation of combinations of n segments from m masters can be configured efficiently to provide a safeguard against attempts to circumvent source identification by using multiple or partial copies to generate a single unauthorized copy. In one implementation, the pseudo-random sequences are generated such that the source can be identified using only a small portion of the unauthorized copy. In another implementation, for an unauthorized copy based on combining multiple sources, the multiple sources can be identified in a similar way.

In one implementation, a Representative Master Key (RMK) is used for robustness of the system with respect to source identification. The RMK is an in-order readout for the segments of a build (copy). As described above, n segments from m masters are used to build a copy. The readout includes n digits (for n segments), where each digit ranges in value from 1 to m. A digit may instead have a value of X, meaning its value does not matter (i.e., "don't care"). Thus, a distribution copy having ten segments produced from eight masters could have an RMK of "1, 4, 2, 5, X, 6, X, 1, 6, 2".

An RMK may also be defined as a sequence of 'tuples', where each tuple is of the form (x, y). The term x is the segment number (varying in order from 1 to n) and the term y is the segment value (ranging in value from 1 to m or having a value of X). In this case, the RMK above could be written as "(1,1) (2,4) (3,2) (4,5) (5,X) (6,6) (7,X) (8,1) (9,6) (10,2)". Accordingly, an RMK can also be written as a sequence of tuples in the form (TupleOrder, MasterNumber).

One way to make two or more distribution copies with different fingerprint identifiers is to give the copies different RMKs. Thus, when presented with a copy of an unknown origin, the system can decode or decipher the RMK of the copy (e.g., by analyzing the marking of each segment in the copy to determine the source master for that segment) and determine from a lookup table/database the source of that copy (e.g., the recipient of the copy as originally distributed). However, if an unauthorized copy has been generated from multiple distribution copies or from a portion of a distribution copy, the unauthorized copy may have an RMK that has not been logged in the database or have an RMK that is logged to another customer, which indicates a false positive identification. Accordingly, the decision of how to construct the RMK can be important in the data fingerprinting process.

In one implementation, an RMK has one or more Key Sets (KSs). Each KS has a length ranging from 1 to the total number of segments (n), and is read out in the form of a list of tuples from the RMK, and arranged in ascending order of TupleOrder, as described above. Different KSs of an RMK may be of different lengths. Thus, in one example, the KSs can be as follows: KS1=(2,4) (3,2) (4,5); KS2=(1,1) (2,4) (6,6) (10,2); KS3=(1,1) (2,4) (3,2) (4,5) (5,X) (6,6) (7,X) (8,1) (9,6) (10,2); KS4=(4,5); and so on. When the RMK of an unknown copy fails to match that of any of the distribution copies listed in the lookup table, the system can perform mathematical calculations to determine how many KSs of an unknown copy match the KSs of the distribution copies in the lookup table. The source distribution copies of the unknown copy will be determined to be the distribution copies that provide a number of KS matches above a selected threshold value.

Different KSs could have different generation techniques. To determine the value of a KS, the generation technique for that KS is applied to the RMK for a copy. For example, some of these techniques are fairly simplistic such that KSs of specific lengths are generated for different RMKs. In one implementation of a KS generation technique, if KS4 is the 4th-tuple, for the RMK="(1,1) (2,4) (3,2) (4,5) (5,X) (6,6) (7,X) (8,1) (9,6) (10,2)", KS4=(4,5). However, KS4 for another RMK could be KS4=(4,7), and so on.

Other KSs may have more detailed generation procedures. In another implementation of a KS generation technique, KS12 may start with the lowest order tuple with the highest master number present in an RMK, followed by a higher order tuple than the first with a lower master number, followed by the next in decreasing order of master numbers. For RMK="(1,1) (2,4) (3,2) (4,5) (5,X) (6,6) (7,X) (8,1) (9,6) (10,2)", since the highest master number present is 6, in (6,6) and (9,6), the procedure selects (6,6) as it has a lower order than (9,6). The next tuple chosen will be one with a master number lower than 6 but with a higher order, which leads the procedure to (10,2). Subsequently, there are no more tuples that match the set rules, so the procedure ends with KS12=(6,6) (10,2). In the case of KS12, the length of the KS is not fixed because of the choice of the procedure.

The above-described procedures are just a few of many possibilities that can be used to obtain good KSs. Accordingly, the fingerprinting system will have an RMK and a number of KSs referencing the RMK for each distribution copy stored in the database. Given a copy of an unknown origin, the system obtains the RMK for the unknown copy. If there is no RMK match in the database, the system generates the KSs for that RMK. Since certain KSs will be localized in certain areas, there is a chance that the system can identify at least a portion of the sources that could have resulted in that specific RMK.

It can be seen that the above-described KS generation technique can be used in reverse to generate a good set of RMKs that will be difficult to obscure. The set of RMKs can be used to construct a set of pseudo-random numbers for a distribution copy such that the copy includes certain KSs that will be difficult to obscure.

There are other ways to increase the robustness of the fingerprinting system. In one implementation, the RMK and/or one or more KSs in data form can be inserted into the distribution copy itself. The insertion can be done at different positions and in different aspects, during the time of generation of the distribution copy. This will allow the system to identify the unknown copy even if the copy has a very small portion of the distribution copy. If that small portion includes one or more of the pieces of the RMK and/or one or more KS data inserted in any of the aspects, the unknown copy can be identified to have originated from the distribution copy.

In another implementation to provide robustness to the fingerprinting system, dummy data can be inserted in data form into the distribution copy itself at different positions and in different aspects, during the time of generation of the distribution copy. The insertion can be done in a pseudo-random fashion to thwart an attempt to circumvent the fingerprint by pattern matching two or more distribution copies.

In a further implementation, certain or all aspects of the distribution copy can be marked with an identifier of the RMK and/or one or more KSs. In this case, even if a copy is remade from many other distribution copies, the required aspects of the distribution copy can be queried to identify the sources of the remade copy.

Figure 9:
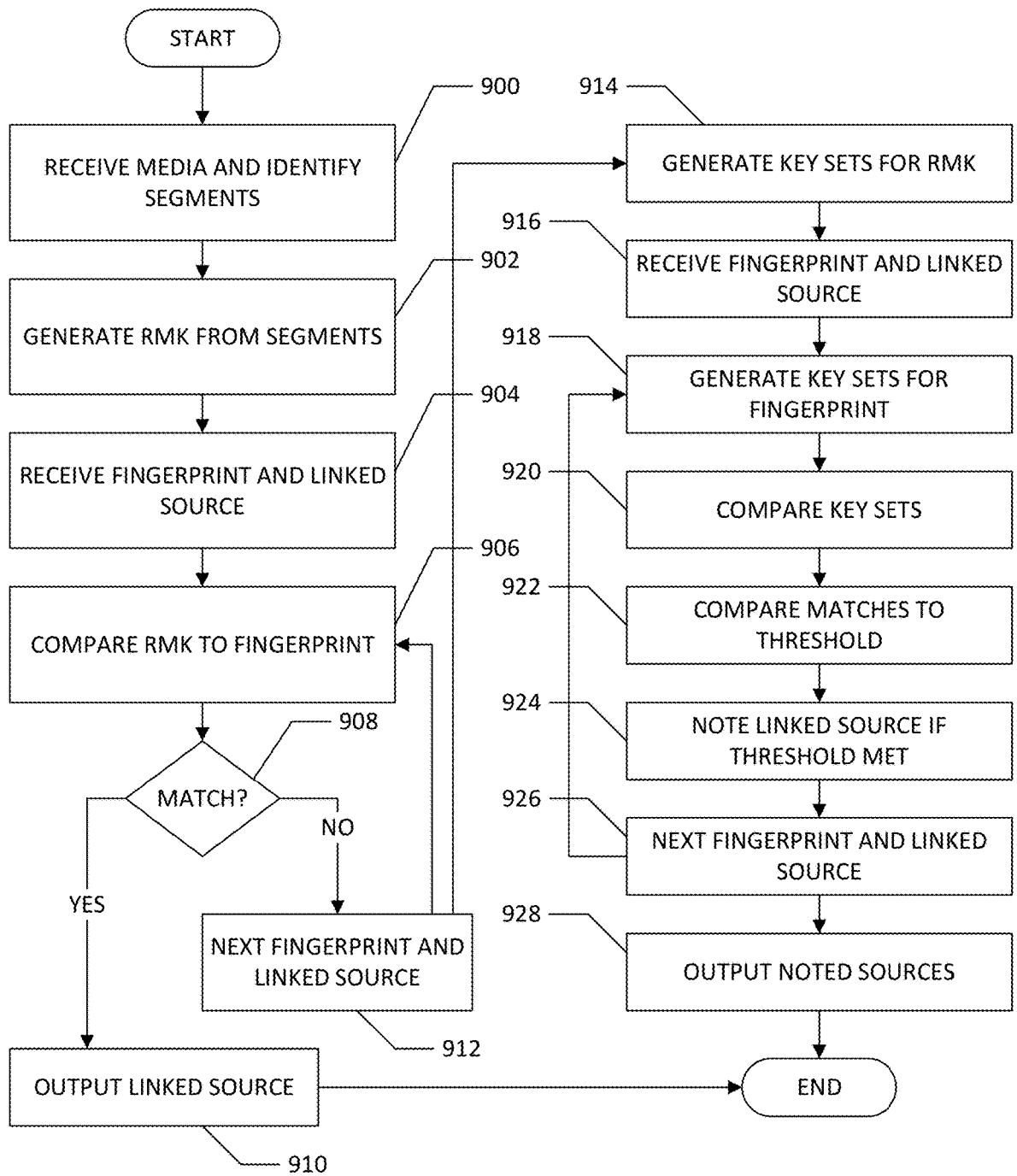
FIG. 9 illustrates a method of identifying a source of media according to one implementation using RMKs and KSs.

FIG. 9 illustrates a method of identifying a source of media according to one implementation using RMKs and KSs. Initially, the media to be identified is received, at 900, and the segments of the media arranged to form the media are identified. A representative master key (RMK) is then generated, at 902, from the arrangement of the segments. A database stores the fingerprints of generated distribution copies and identifiers linked to fingerprints indicating the source that received the distribution copy corresponding to the linked fingerprint. In one implementation, the source linked to the fingerprint can be a name of the person who received a distribution copy.

A fingerprint and a source linked to the fingerprint are received from the database at 906. The RMK and the fingerprint are compared, at 906. If the comparison results in a match (i.e., a YES result at 908), then the linked source is output, at 910. Otherwise, if the comparison between the RMK and the fingerprint does not result in a match (i.e., a NO result at 908), then the next fingerprint and linked source are received from the database, at 912.

If all the fingerprints have been checked against the RMK and none match, then the key sets are generated from the RMK, at 914. Thus, when there is no match between the RMK and the fingerprint, it indicates that the media in question was probably not copied entirely from one distribution copy. Therefore, key sets are generated to analyze portions of the media to identify the source(s).

A fingerprint and a source linked to the fingerprint are received from the database at 916. The key sets are generated from the fingerprint, at 918. The key sets generated from the RMK and the key sets generated from the fingerprint are compared, at 920. If the number of matches between the key sets exceeds some threshold value, at 922, then the source linked to the fingerprint is noted, at 924. The next fingerprint and linked source is received from the database, at 926, and the key sets for that fingerprint are generated for comparison, returning to 918. When the key sets for all the fingerprints have been compared to the key sets for the RMK, the sources noted at 924 are output, at 928, as probable sources for at least part of the media received at 900. Alternatively, once one of the fingerprints is found that has key sets meeting the threshold of matches at 922, the source linked to that fingerprint is output.

In a further embodiment, the RMK and/or one or more KSs in data form inserted into the distribution copy can be used to identify the source of media. Furthermore, the embedded RMK and/or KSs can be used in addition to the above-described identification process of FIG. 9 to increase the robustness of the fingerprinting system.

Various implementations of the invention are realized in electronic hardware, computer software, or combinations of these technologies. Most implementations include one or more computer programs executed by a programmable computer. For example, in one implementation, the system for identifying a distribution copy includes one or more computers executing software implementing the identification processes discussed above. In another implementation, the system for fingerprinting data can include one or more computers executing software implementing the above-described fingerprinting processes. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, while the above description describes several implementations of fingerprinting media data (e.g., movies), in other implementations, other types of data can be used, such as executable software or scientific data.

Accordingly, the present invention is not limited to only those implementations described above.

What is claimed is:

1. A method of fingerprinting to generate a fingerprinted copy, the method comprising:
receiving a plurality of master datasets, each master dataset divided into a plurality of input segments,
wherein each of said plurality of master datasets is uniquely digitally watermarked;
selecting a first input segment for the fingerprinted copy from a corresponding segment of one of said plurality of master datasets,
wherein selecting one master dataset for the segment corresponding to the first input segment is done pseudo-randomly and is recorded in a source identifier;
repeating selecting a next input segment for the fingerprinted copy from a corresponding segment of one of said plurality of master datasets that has not yet been selected until all segments of the fingerprinted copy have been selected,
wherein the source identifier represents a sequence of input segments used for the fingerprinted copy,
wherein selecting one master dataset for the segment corresponding to the next input segment is done pseudo-randomly and is recorded in the source identifier;
associating the source identifier to the fingerprinted copy; and
sending said fingerprinted copy and the associated source identifier to a client computer system over a computer network,
wherein said fingerprinted copy is distributed and the associated source identifier is later used to identify a receiver of said fingerprinted copy,
wherein the receiver is identified by comparing the associated source identifier of the fingerprinted copy with a list of fingerprints stored in a distribution database and identifying a person that matches a fingerprint from the list of fingerprints.

2. The method of claim 1, wherein the first input segment and the next input segment are pseudo-randomly selected from one of said plurality of master datasets.

3. The method of claim 1, wherein sending said fingerprinted copy comprises
streaming said fingerprinted copy.

4. A method of fingerprinting to generate a fingerprinted copy, the method comprising:
receiving a plurality of master datasets, each master dataset divided into a plurality of input segments,
wherein each of said plurality of master datasets is uniquely digitally watermarked;
sending a sequence of segments of a fingerprint file to a client computer system over a computer network, wherein each sent segment is selected from a corresponding segment of one of said plurality of master datasets,
wherein selecting one master dataset for the segment corresponding to the segment is done pseudo-randomly;
storing in a segment identifier for each sent segment indicating from which master dataset that sent segment was selected,
wherein the arrangement of said segment identifiers in said fingerprint file provides fingerprinting of said sequence of segments; and
associating the segment identifier to the fingerprint file,
wherein the fingerprint file is distributed and the associated segment identifier is later used to identify a receiver of the fingerprint file,
wherein the receiver is identified by comparing the associated source identifier of the fingerprinted file with a list of fingerprints stored in a distribution database and identifying a person that matches a fingerprint from the list of fingerprints.

5. The method of claim 4, wherein sending said sequence of segments of the fingerprint file comprises
streaming said sequence of segments.

6. The method of claim 4, wherein sending said sequence of segments of the fingerprint file to a client computer system over a computer network comprises
streaming said sequence of segments over a cable network.

* * * * *